US009553800B2

(12) United States Patent
Lin

(10) Patent No.: US 9,553,800 B2
(45) Date of Patent: Jan. 24, 2017

(54) REDUCING FLOODING OF LINK STATE INFORMATION

(71) Applicant: Hangzhou H3C Technologies Co., Ltd., Hangzhou, Zhejiang (CN)

(72) Inventor: Changwang Lin, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 75 days.

(21) Appl. No.: 14/374,288

(22) PCT Filed: Jun. 18, 2013

(86) PCT No.: PCT/CN2013/077369
§ 371 (c)(1),
(2) Date: Jul. 24, 2014

(87) PCT Pub. No.: WO2014/005479
PCT Pub. Date: Jan. 9, 2014

(65) Prior Publication Data
US 2014/0369233 A1 Dec. 18, 2014

(30) Foreign Application Priority Data
Jul. 3, 2012 (CN) .......................... 2012 1 0230484

(51) Int. Cl.
H04L 12/721 (2013.01)
H04L 12/751 (2013.01)

(52) U.S. Cl.
CPC ............... H04L 45/32 (2013.01); H04L 45/02 (2013.01)

(58) Field of Classification Search
None
See application file for complete search history.

(56) References Cited

U.S. PATENT DOCUMENTS 6,820,134 B1 11/2004 Zinin et al.
7,031,267 B2 * 4/2006 Krumel ................... H04L 29/06
370/255

(Continued)

FOREIGN PATENT DOCUMENTS

CN 1412989 4/2003

OTHER PUBLICATIONS

International Search Report and Written Opinion dated Sep. 19, 2013 issued on PCT Patent Application No. PCT/CN2013/077369 dated Jun. 18, 2013, The State Intellectual Property Office P.R. China.

(Continued)

Primary Examiner — Donald Mills
(74) Attorney, Agent, or Firm — Hewlett Packard Enterprise Patent Department

(57) ABSTRACT

The present disclosure describes reducing flooding of link state information of a link state protocol in a network with multiple routers. A filtering strategy is pre-configured on a router interface for filtering link state information generated by a first router. The filtering strategy is to enable link state database (LSDB) isolation between a second router associated with the router interface and the first router. Link state information generated by the first router is received or sent according to the pre-configured filtering strategy via the router interface.

13 Claims, 8 Drawing Sheets

(56) References Cited

U.S. PATENT DOCUMENTS

| | | | |
|---|---|---|---|
| 7,334,047 B1* | 2/2008 | Pillay-Esnault | H04L 45/02 |
| | | | 709/239 |
| 7,558,214 B2 | 7/2009 | Previdi et al. | |
| 7,742,431 B2 | 6/2010 | Ng et al. | |
| 8,351,438 B2 | 1/2013 | Ward et al. | |
| 8,614,952 B2* | 12/2013 | Rege | H04L 45/026 |
| | | | 370/238 |
| 2002/0150094 A1* | 10/2002 | Cheng | H04L 12/185 |
| | | | 370/389 |
| 2007/0217346 A1* | 9/2007 | Zheng | H04L 45/00 |
| | | | 370/255 |
| 2007/0274212 A1 | 11/2007 | Kolenchery et al. | |
| 2009/0041037 A1 | 2/2009 | Yang et al. | |
| 2011/0090787 A1* | 4/2011 | Smith | H04L 41/0659 |
| | | | 370/225 |

OTHER PUBLICATIONS

CN First Office Action dated Dec. 25, 2015, CN Patent Application No. 201210230484.X dated Jul. 3, 2012, State Intellectual Property Office of the China.

* cited by examiner

Filtering Strategy at P1 ⌒ 310

| Type | Action | Source router | Yes/No |
|---|---|---|---|
| Global | Transmit to RT2 | RT1, RT3 | No |

Filtering Strategy at R2 ⌒ 320

| Type | Action | Source router | Yes/No |
|---|---|---|---|
| Global | Receive from MTR1 | RT1, RT3 | No |

Filtering Strategy at P1 ⌒ 330

| Type | Action | Source router | Yes/No |
|---|---|---|---|
| Interface | Transmit to RT2 | RT1 | No |

Filtering Strategy at R2 ⌒ 340

| Type | Action | Source router | Yes/No |
|---|---|---|---|
| Interface | Receive from MTR1 | RT1 | No |

REDUCING FLOODING OF LINK STATE INFORMATION

CROSS-REFERENCE TO RELATED APPLICATION

The present application is a 371 application of International Application No. PCT/CN2013/077369 filed on Jun. 18, 2013 and entitled "Reducing Flooding of Link State Information," which claims benefit of Chinese Patent App. No. CN 201210230484.X filed on Jul. 3, 2012.

BACKGROUND

Link state routing protocols are used for communication in packet-switched networks. Routers exchange link state information with each other using a flooding process, where each router creates link state information and floods it to their neighbours. The link state information is used to maintain a link state database (LSDB) that reflects the topology of the autonomous system.

BRIEF DESCRIPTION OF DRAWINGS

The present disclosure will refer to examples in the following drawings, in which.

DETAILED DESCRIPTION

Link state information may be exchanged by routers for the purpose of LSDB synchronization. For instance, each router may receive link state information generated by its neighbours, so that each router may synchronize its LSDB with that of its neighbours. Since a flooding process is used to exchange the link state information, this creates a lot of traffic in the network and a burden on the routers to process the information.

The present disclosure describes a method for reducing flooding of link state information of a link state protocol in a network with multiple routers. A filtering strategy is pre-configured on a router interface for filtering link state information generated by a first router. The filtering strategy is to enable LSDB isolation between a second router associated with the router interface and the first router. Link state information generated by the first router is received or sent according to the pre-configured filtering strategy via the router interface.

Throughout the present disclosure, the term "LSDB isolation" broadly describes the situation where the LSDB of a router is not synchronized with the LSDB of at least one neighbouring router. By pre-configuring the filtering strategy, unnecessary link state information is filtered so that the information is not received or sent via a router interface, thus enabling LSDB isolation. This in turn reduces flooding of link state information in the network. From the routers' perspective, this reduces the processing burden associated with route calculation and LSBD update, as well as the size of their LSDB.

Examples will be described with reference to the accompanying drawings.

Figure 1:
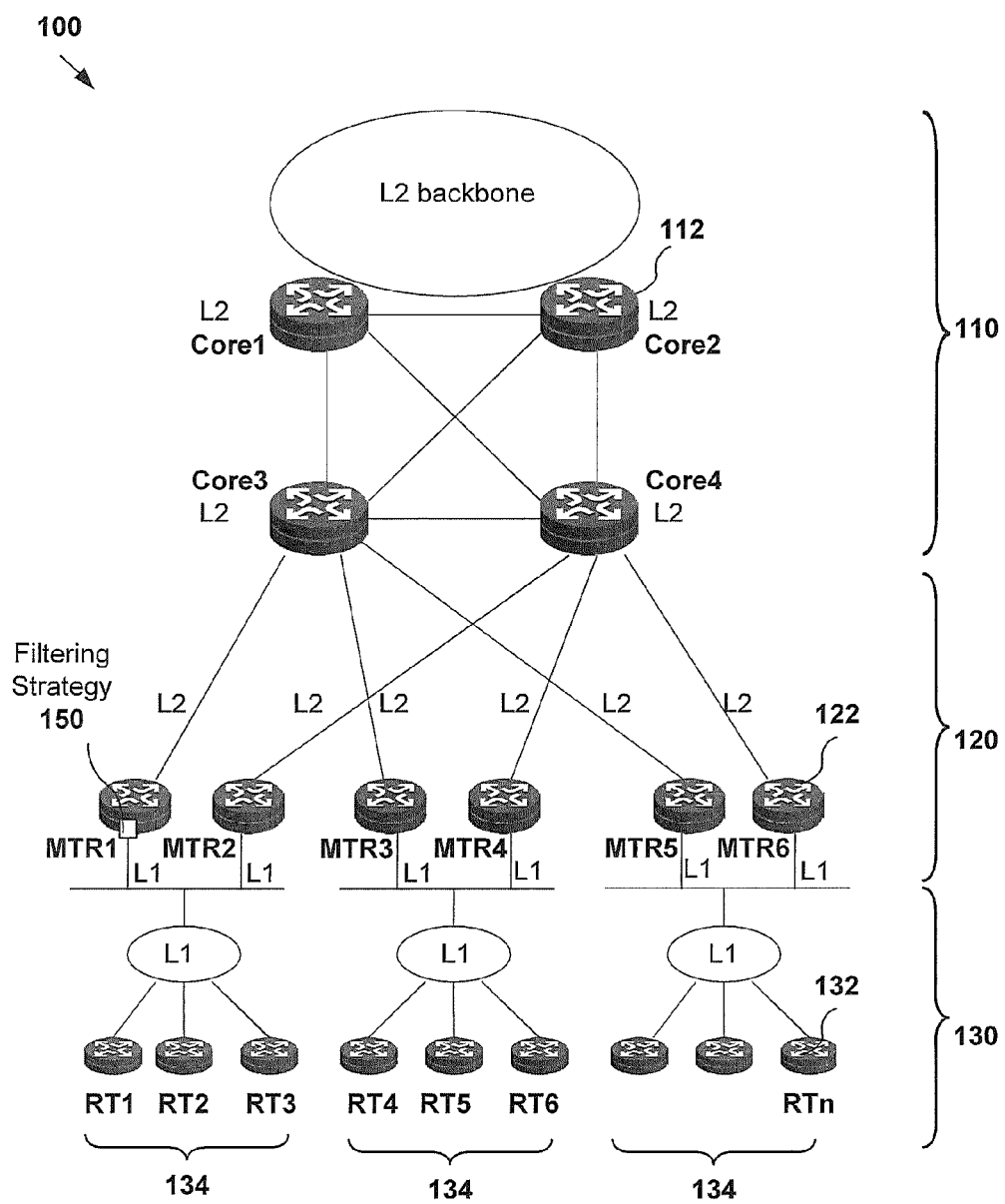
FIG. 1 is a block diagram of a first example network environment for reducing flooding of link state information.

FIG. 1 is a schematic diagram of an example network environment 100 for reducing flooding of link state information of a link state protocol. The network environment 100 in FIG. 1 includes three layers: core layer 110, convergence layer 120 and access layer 130 on which routers 112, 122, 132 are deployed. For example:

The core layer 110 serves as the backbone for the network 100 and is deployed with Level 2 (L2) routers 112 (e.g. Core1 to Core4).

The convergence layer 120 (also known as a distribution layer) is deployed with Level 1-2 (L12) routers 122 (e.g. MTR1 to MTR6) to facilitate traffic routing within the access layer 130. L12 routers have both L1 and L2 routing functions.

The access layer 130 connects to the convergence layer 120, and is deployed with Level 1 (L1) routers 132 (e.g. RT1 to RTn). The access layer 130 is generally where end users or end systems (ES) connect to the network 100.

Throughout the present disclosure, the terms 'L2', 'L12' and 'L1' broadly refer to different levels of routers deployed in the core 110, convergence 120 and access 130 layers. Use of these terms should not be confused with the layers of an OSI (Open Systems Interconnection) protocol stack, such as Layer 1 (physical layer), Layer 2 (link layer) etc. For example, the core 110, convergence 120 and access 130 layers may be logical layers in the network environment 100 with the functions described above. Further, the term "router" is used broadly in the present disclosure to refer to a network device with routing functionality, such as a network router, or a switch with routing functionality etc.

A group of routers using the same protocol to exchange routing information is generally referred to as a "routing domain", which can be further divided into different "areas" or "sections" 134. For example, the L1 routers 132 deployed in the access layer 130 belong to different areas 134. In FIG. 1, a first group of routers (i.e. RT1, RT2 and RT3) belong to a first area, while a second group (i.e. RT4, RT5 and RT5) belong to a different L1 area.

Each router 112, 122, 132 runs a link state protocol and maintains a LSDB that stores the router's local state, such as the router's interfaces and how to reach its neighbours etc. L2 routers may establish neighbour relationship with L2 routers and L12 routers in the same or different areas. L12 routers may establish L1 neighbour relationship with L1 and L12 routers in the same area, or L2 neighbour relationships with L2 and L12 routers in different areas. L1 routers 132 only establish neighbour relationship with L1 and L12 routers in the same area.

If no filtering strategy is pre-configured, neighbouring routers (e.g. RT1, RT2 and RT3) exchange link state information to synchronize their LSDBs. Each router receives link state information from its neighbours, performs route calculation and updates its LSDB. For example, using a flooding process, RT1 sends its link state information to RT2 and RT3, RT2 sends to RT1 and RT3, and RT3 sends to RT1 and RT2. L1 routers RT1, RT2, RT3 exchange the link state information via a L2 router, e.g. MTR1. The flooding process is generally repeated from time to time.

As the number of neighbouring routers increases, the traffic caused by the flooding process also increases. In this case, since there is more link state information to process, this also increases the burden on router CPUs to maintain a larger LSDB.

In the example in FIG. 1, LSDB isolation is enabled between routers to reduce flooding of link state information in the network 100. For example, when LSDB isolation is enabled between routers RT1 and RT2, they do not synchronize their LSDBs, i.e. RT1 does not have to process the link state information generated by RT2 to update its LSDB, and vice versa.

Figure 2:
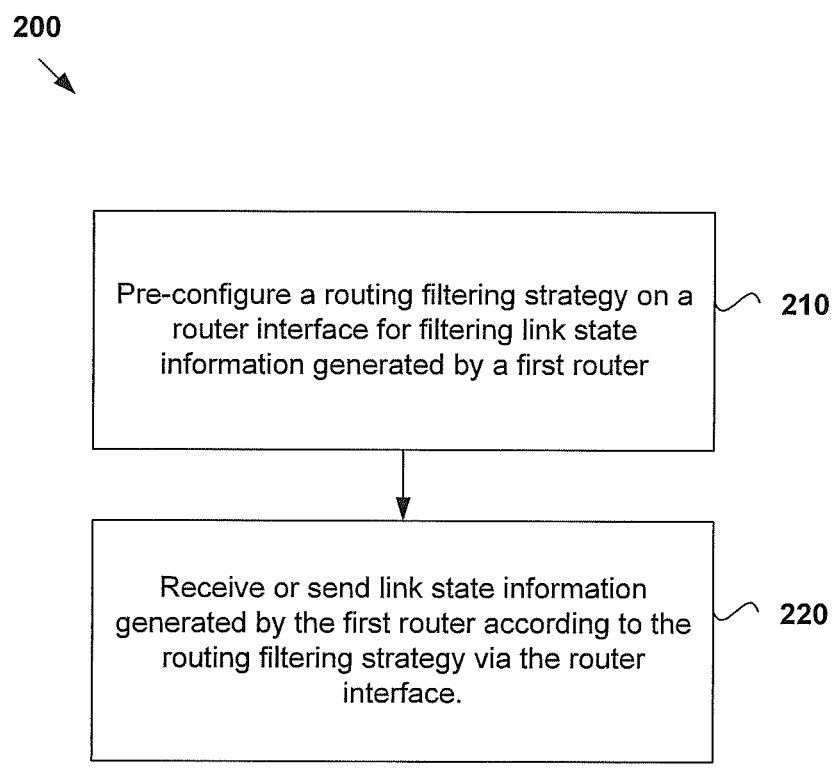
FIG. 2 is a flowchart of an example method for reducing flooding of link state information.

FIG. 2 shows an example method 200 for reducing flooding of link state information of a link state protocol. LSDB isolation is enabled by pre-configuring a filtering strategy 150. The example method 200 includes:

At block 210, a filtering strategy or route filtering strategy (see 150 in FIG. 1) is pre-configured on a router interface (e.g. an interface on MTR1) for filtering link state information generated by a first router (e.g. RT1). The filtering strategy 150 enables LSDB isolation between (i) the first router (e.g. RT1), and (ii) a second router (e.g. RT2) associated with the router interface.

At block 220, link state information generated by the first router is received or sent via the router interface (e.g. interface on MTR1) according to the pre-configured filtering strategy 150.

Throughout the present disclosure, the term "link state information" refers to any link state information generated by a link state protocol to facilitate routing in the network. Examples of the "link state protocol" include the Intermediate System-to-Intermediate System (IS-IS), Open Shortest Path First (OSPF), etc. The link state information may be in any suitable format, such as Link State Packets (LSPs) when IS-IS is used, and Link State Advertisements (LSAs) when Open Shortest Path First (OSPF) is used. LSPs may also be Link State Protocol data units.

The term "link state information" may also refer to other types of link state information such as complete sequence number PDUs (CSNPs) and partial sequence number PDUs (PSNPs) etc. The CSNPs and PSNPs are exchanged among IS-IS routers in order to maintain a correct LSDB. CSNPs contain a list of link state information from the current database to inform other routers that may have outdated or missing information. This ensures all routers have the same information and their LSDBs are synchronized. In general, when a router receives CSNP, it compares header information of the CSNP with its local link state information. If the local link state information is incomplete, the router will send a PSNP to request any missing link state information. PSNPs contain partial link state information and are used to request link state information or acknowledge receipt of link state information.

Figures 3A, 3B, 3C:
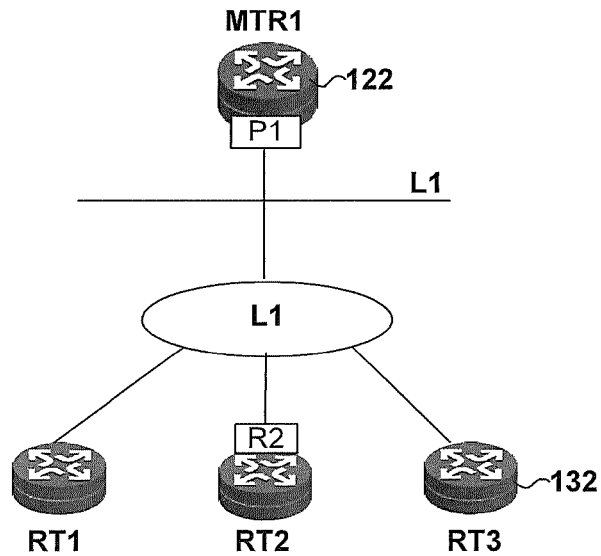
FIG. 3A is a block diagram of part of the first example network environment in FIG. 1.
FIG. 3B shows example global filtering strategies and FIG. 3C shows example interface filtering strategies.

Referring also to the examples in FIGS. 3A, 3B and 3C, the LSDB isolation between the routers may be complete or partial. For simplicity, FIG. 3A shows part of the network environment 100 in FIG. 1 that includes MTR1 in the convergence layer 120, and RT1, RT2 and RT3 in the access layer 130.

Complete LSDB isolation broadly refers to the case where a router (e.g. RT2) does not process link state information generated by all of its neighbours (e.g. RT1 and RT3), except its upstream (UP) neighbour (e.g. MTR1). The term "upstream" in the present disclosure refers to the direction from the access layer 130 to the convergence layer 120 to the core layer 110. For example, MTR1 in the convergence layer 120 is an upstream neighbour of RT1, RT2 and RT3 in the access layer 130, and RT1, RT2 and RT3 are downstream neighbours of MTR1. Similarly, 'Core 3' in the core layer 110 is an upstream neighbour of MTR1, and MTR1 is a downstream neighbour of 'Core 3' etc. See FIG. 1 again.

Referring to 310 and 320 in FIG. 3B, complete LSDB isolation may be achieved by pre-configuring a "global" filtering strategy. In this example, 310 or 320, or both, may be pre-configured to enable complete LSDB isolation.

A first global filtering strategy (see 310) may be pre-configured on L12 router MTR1's interface P1 (to which RT2 is connected) to filter link state information generated by RT2's L1 neighbours, i.e. RT1 and RT3. Once a filtering strategy has been pre-configured, MTR1 does not send link state information generated by RT1 and RT3 to RT2 via interface P1. Since MTR1 is an UP neighbour of RT2, MTR1 only sends link state information generated by itself (i.e. MTR1) to RT2 via interface P1.

Alternatively or additionally, a second global filtering strategy (see 320) may be pre-configured on RT2's router interface R2 to filter link state information generated by RT1 and RT3. Once pre-configured, RT2 discards or does not receive link state information generated by RT1 and RT3 via interface R2. Since MTR1 is an UP neighbour of RT2 (i.e. MTR1 is a neighbour of interface R2), RT2 only receives link state information generated by MTR1 via interface R2.

Partial LSDB isolation broadly refers to the case where a router (e.g. RT2) does not process link state information generated by at least one neighbour (e.g. RT1), but continues to do so for link state information generated by at least one other neighbour (e.g. RT3). Referring to 330 and 340 in FIG. 3C, partial LSDB isolation may be achieved by pre-configuring an "interface" filtering strategy.

A first interface filtering strategy (see 330) may be pre-configured on L12 router MTR1's interface P1 (to which RT2 is connected) to filter link state information generated by RT1 but not RT3. Once pre-configured, MTR1 does not send link state information generated by RT1 to RT2 via interface P1 to enable LSDB isolation between RT1 and RT2. However, MTR1 will continue sending link state information by RT3 to RT2 via P1.

Alternatively or additionally, a second interface filtering strategy (see 340) may be pre-configured on RT2's router interface R2 to filter link state information generated by RT1. Once pre-configured, RT2 discards link state information generated by RT1 via interface R2 to enable LSDB isolation between RT1 and RT2. However, RT2 will continue receiving link state information generated by RT3.

Based on the above, the example method may be implemented on a router in the core layer 110, convergence layer 120 (e.g. MTR1) or access layer 130 (e.g. RT2) to reduce flooding of link state information. Also, the term "associated with" in block 210 broadly describes any suitable association, such as the case where the second router is connected to the router interface (e.g. RT2 is connected to P1 of MTR1), or the router interface is an interface of the second router (e.g. R2 is an interface of RT2).

The link state information may include the system ID of the source router, i.e. the router that generated the link state information. The system ID may be a single value or a range of values, and configured as required. As such, the strategy of whether to receive or send is made by checking the system ID in the link state information.

Figure 4:
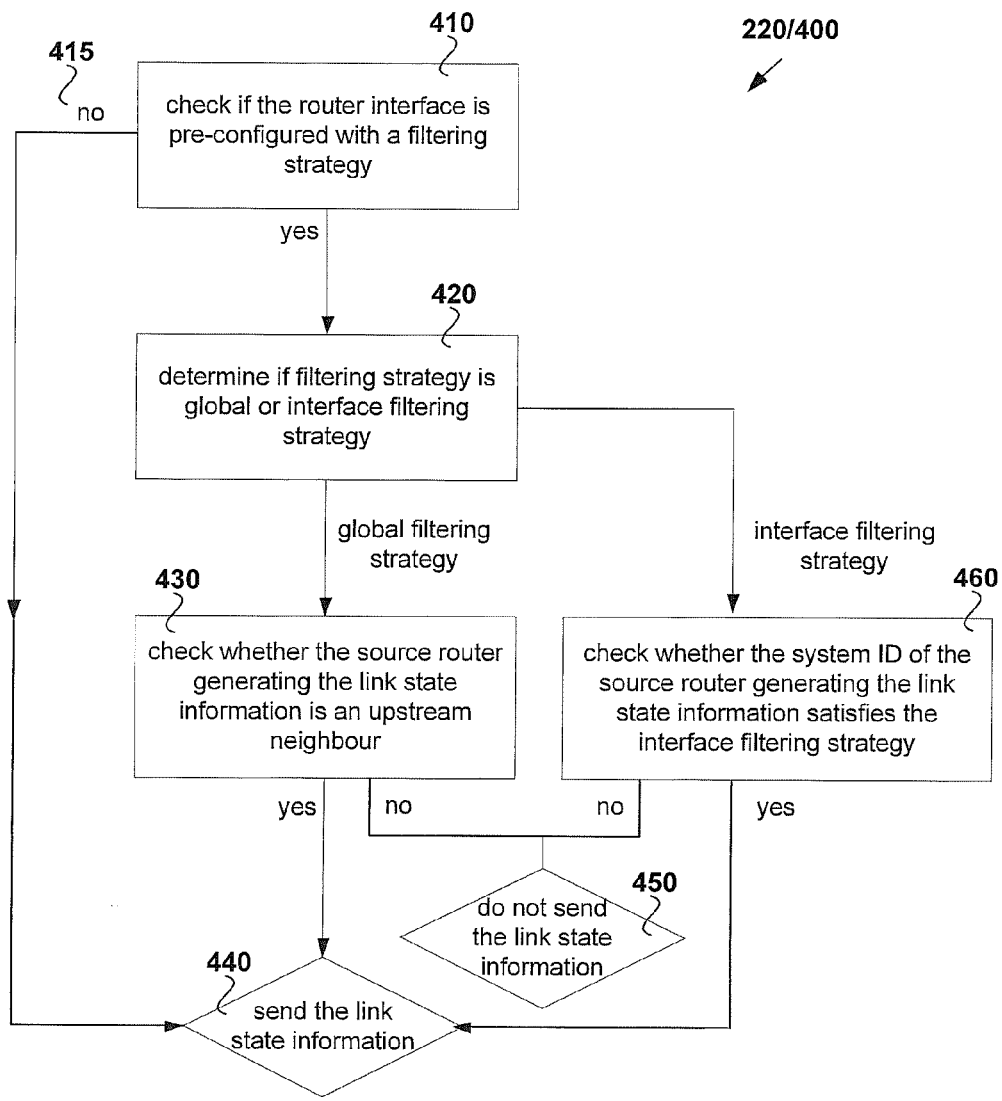
FIG. 4 is a flowchart of an example process for receiving link state information according to a pre-configured filtering strategy.

FIG. 4 shows an example implementation of block 220 in FIG. 2 when sending link state information via a router interface according to a pre-configured filtering strategy. For ease of understanding, the terms "sender router" (e.g. MTR1) and "recipient router" (e.g. RT2) below respectively refer to the router sending and router (potentially) receiving the link state information generated by a "source router". The "source router" may be the "sender router" itself (e.g. MTR1), or a different router (e.g. RT1).

- At 410, when a sender router (e.g. MTR1) is sending link state information to a recipient router (e.g. RT2) via a router interface (e.g. P1), the sender router checks whether the router interface is pre-configured with a filtering strategy.
- At 415, if no filtering strategy is pre-configured, the sender router (e.g. MTR1) sends the link state information to the recipient router (e.g. RT2) via the router interface (e.g. P1) and performs the necessary processing.
- At 420, the sender router (e.g. MTR1) determines whether the filtering strategy is a global or interface filtering strategy. 430 is performed if a global filtering strategy is pre-configured, but otherwise (interface filtering strategy) 460 is performed.
- At 430, if the router interface (e.g. P1) is pre-configured with a global routing filtering strategy (e.g. 310 in FIG. 3B), the sender router (e.g. MTR1) checks whether the source router of the link state information is an UP neighbour of the recipient router (e.g. MTR1 is an UP neighbour of RT2).
- At 440, if yes (e.g. source router is MTR1), the link state information is sent by the sender router (e.g. MTR1) to the recipient router (e.g. RT2) via the router interface (e.g. P1).
- Otherwise, at 450, the link state information (e.g. source router is RT1 or RT3) will be discarded. This enables LSDB isolation between RT1 and RT2, as well as between RT3 and RT2.
- At 460, if the router interface (e.g. P1 of MTR1) is pre-configured with an interface filtering strategy (e.g. 330 in FIG. 3C), the sender router (e.g. MTR1) checks whether the system ID of the source router (e.g. RT1) generating the link state information satisfies the interface filtering strategy.
- At 440, if yes (e.g. source router is RT3), the link state information will be sent via the router interface (e.g. P1) to the recipient router (e.g. RT2). Otherwise at 450 (e.g. source router is RT1), the link state information will not be sent. This enables LSDB isolation between RT1 and RT2, but not RT3 and RT2.

Figure 5:
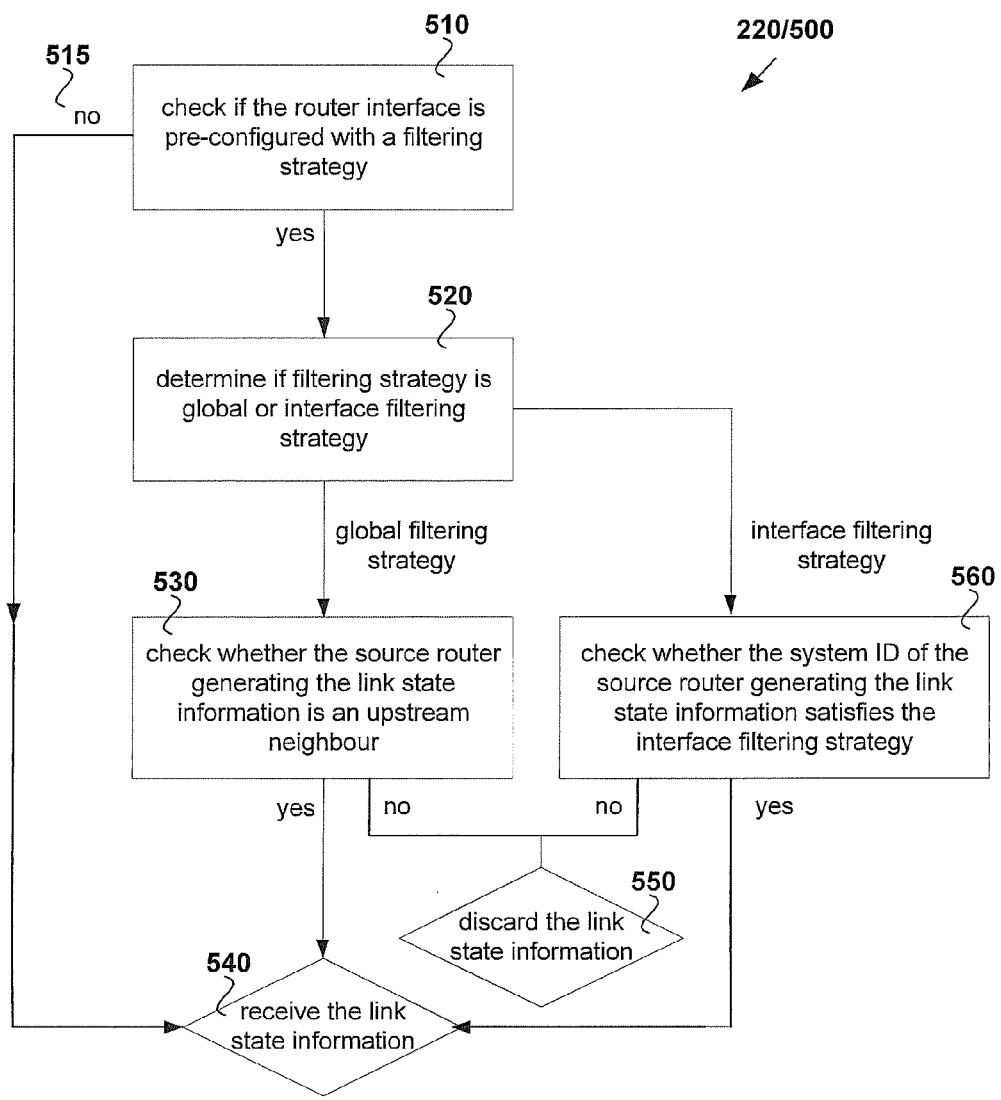
FIG. 5 is a flowchart of an example process for transmitting link state information according to a pre-configured filtering strategy.

FIG. 5 shows an example implementation of block 220 in FIG. 2 when receiving link state information via a router interface according to a pre-configured filtering strategy.

- At 510, when a router (e.g. RT2) is receiving link state information via a router interface (e.g. R2 of RT2), the router (e.g. RT2) checks whether the router interface is pre-configured with a filtering strategy.
- At 515, if no filtering strategy pre-configured, the router (e.g. RT2) receives the link state information via the router interface (e.g. R2) and performs the necessary processing of the link state information.
- At 520, the router (e.g. RT2) determines whether the filtering strategy is a global or interface filtering strategy. 530 is performed if a global filtering strategy is pre-configured, but otherwise (interface filtering strategy) 560 is performed.
- At 530, if the router interface (e.g. R2) is pre-configured with a global routing filtering strategy (e.g. 320 in FIG. 3B), the router (e.g. RT2) checks whether the source router of the link state information is an UP neighbour (e.g. MTR1) of the interface.
- At 540, if yes, the link state information generated by its UP neighbour (e.g. MTR1) is received via the router interface (e.g. R2).
- Otherwise, at 550, the link state information is discarded. In other words, link state information generated by other routers (e.g. RT1 and RT3) will be discarded. This enables LSDB isolation between RT1 and RT2, as well as between RT3 and RT2.
- At 560, if the router interface (e.g. R2 of RT2) is pre-configured with an interface filtering strategy (e.g. 340 in FIG. 3C), the router (e.g. RT2) checks whether the system ID of the source router (e.g. RT1) generating the link state information satisfies the interface filtering strategy.
- At 540, if yes (e.g. source router is RT3), the link state information is received via the router interface (e.g. R2). Otherwise, at 550 (i.e. source router is RT1), the link state information is discarded. This enables LSDB isolation between RT1 and RT2, but not RT3 and RT2.

Based on the above examples, the interface filtering strategy (e.g. 330, 340 in FIG. 3C) is more flexible than the global filtering strategy (e.g. 310, 320 in FIG. 3B) because the interface filtering strategy is based on system ID of the source router generating the link state information. On the other hand, once the global filtering strategy is pre-configured, complete LSDB isolation is implemented. In the example in FIG. 3A, the interface filtering strategy may be used if RT2 only requires LSDB isolation from RT3 but not RT1. Otherwise, the global filtering strategy may be preferred if RT2 requires LSDB isolation from both RT1 and RT3, i.e. complete LSDB isolation.

It should be noted that the system ID(s) configured by the interface filtering strategy may be a blacklist or a whitelist. For example, the interface filtering strategy 330 in FIG. 3C includes the system ID of RT1 in a blacklist Link state information generated by routers in the blacklist will not be received or sent. Alternatively, the system ID of RT1 may be excluded from a whitelist. Link state information generated by routers in the whitelist will be received or sent.

Example Network 600

Figure 6:
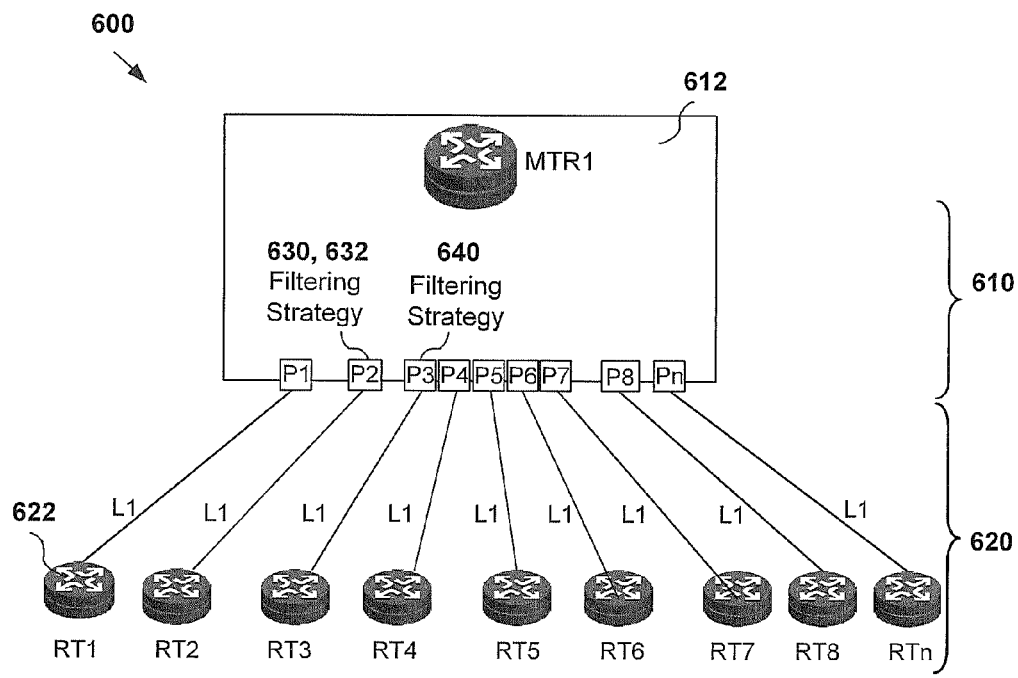
FIG. 6 is a block diagram of a second example network environment for reducing flooding of link state information.

Using pre-configuration of filtering strategy, a network 600 having a flat hub-and-spoke topology may be implemented. An example is shown in FIG. 6 in which an L12 router 612 (i.e. MTR1) in the convergence layer 610 is connected to multiple neighbouring L1 routers 622 (i.e. RT1, RT2 to RTn) in the access layer 520 via different interfaces (i.e. P1, P2 to Pn). The L12 router 612 (e.g. MTR1) may be connected to a L2 router in the core layer (not shown for simplicity). Compared with the network topology in FIG. 1, the L1 routers 622 in FIG. 6 do not have to be separated into different areas (e.g. 134 in FIG. 1) using multiple L12 routers. Instead, according to the example hub-and-spoke topology 600, MTR1 is connected to L1 routers RT1 to RTn, e.g. MTR1 may be interpreted as a 'hub' that is connected to L1 routers RT1 to RTn via links or 'spokes'.

If no filtering strategy is pre-configured, LSDB isolation cannot be implemented among the L1 routers 622 in the network 600 because the L1 routers 622 are within the same area. Thus, link state information of an L1 router (e.g. RT1) is sent to every other neighbour L1 router (e.g. RT2 to RTn). For example, RT1 generates and sends link state information to MTR1 612, which forwards it to neighbour routers RT2 to RTn. This flooding process is repeated for link state information generated by other routers (RT2 to RTn) to synchronize their LSDBs.

Similar to FIG. 1, a filtering strategy (e.g. 630, 632, 640) may be pre-configured on an interface between an L12 router (i.e. MTR) and an L1 router (e.g. RT2) to enable complete or partial LSDB isolation.

In a first example, if it is not necessary for RT2 to process link state information generated by RT1, an interface filtering strategy 630 is pre-configured on a router interface between MTR and RT2 (i.e. P2). The interface filtering strategy 630 includes the system ID of RT1. When MTR receives link state information generated by RT1, MTR will not send the link state information to RT2. As such, the interface filtering strategy 630 enables LSDB isolation between RT1 and RT2.

In a second example, if it is not necessary for RT2 to receive and store link state information generated by all other L1 routers (i.e. RT1, RT3, . . . , RTn), a global filtering strategy 632 is pre-configured on an interface between MTR and RT2 (i.e. P2). According to the global filtering strategy 632, MTR only sends link state information generated by its UP neighbour MTR to RT2, but link state information generated by neighbour routers RT1, RT3, . . . , RTn will not be forwarded to RT2. As such, the global filtering strategy 632 enables complete LSDB isolation between RT2 each of its neighbour routers RT1, RT3, . . . , RTn within the access layer 130.

In a third example, if LSBD isolation is required between RT3 and its neighbour routers in the access layer 130, a global filtering strategy 640 may be pre-configured on an interface between MTR and RT3 (i.e. P3). This process may be repeated for any other router which requires complete LSDB isolation.

Although the filtering strategy is pre-configured on MTR's interface in the above examples, it should be understood that the filtering strategy may be configured on an L1 router in the access layer. For example, instead of pre-configuring a filtering strategy on router interface P2 of MTR, the strategy may be pre-configured on a router interface of RT2 (not labelled in FIG. 6 for simplicity).

Similarly, consider the situation where RT2 also sends link state information generated by RT3 to RT1. To reduce flooding of link state information between RT1 and RT2, an interface filtering strategy is configured on the interface between RT1 and RT2 such that RT2 does not send link state information generated by RT3 to RT1. In other words, once RT2 recognizes that the source router of the link state information is the system ID of RT3, RT2 will not send it to RT1.

In FIG. 1, L12 routers (i.e. MTR1 to MTR6) deployed in the convergence layer 120 allow L1 routers (i.e. RT1 to RTn) to be isolated into different areas (see 134) such that L1 routers from different areas do not have to exchange link state information. Since the example method in FIG. 2 enables LSDB isolation through pre-configuration of filtering strategy, a hub-and-spoke topology may be used in the convergence layer.

Example Network 700

Using pre-configuration of filtering strategy, a network topology may also be simplified, therefore reducing the number of routers required and corresponding deployment cost and efforts. For example in FIG. 1, L12 routers (i.e. MTR1 to MTR6) allow physical separation of L1 routers (i.e. RT1 to RTn) into different areas (see 134) such that L1 routers in different areas (e.g. RT1 and RT5) do not have to exchange link state information. However, the use of a filtering strategy enables LSDB isolation between routers (e.g. RT1 and RT2) in the same area. Therefore when a filtering strategy is used the network may require less L12 routers than would be the case if no filtering strategy was used.

Figure 7:
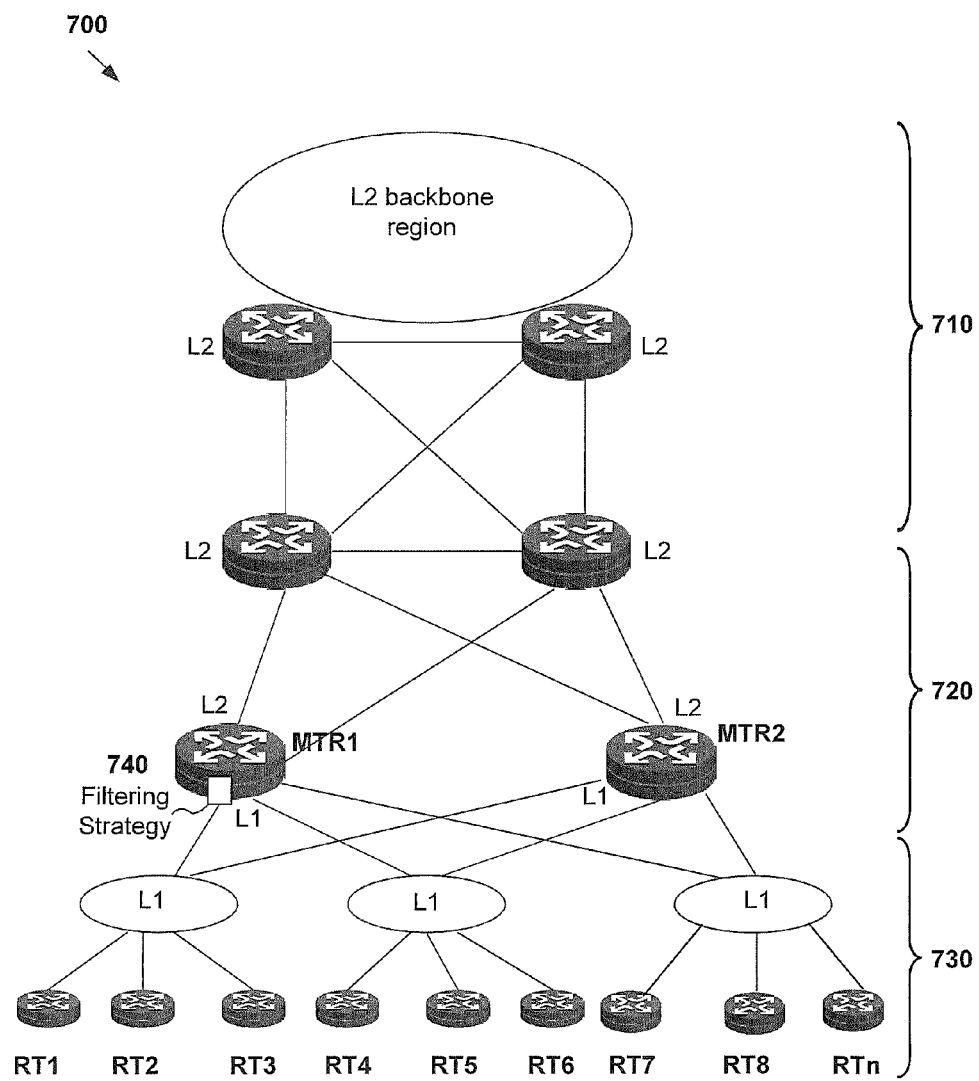
FIG. 7 is a block diagram of a third example network environment for reducing flooding of link state information.

FIG. 7 is a schematic diagram of a third example network environment 700 in which link state information flooding may be reduced. Compared with FIG. 1, the network environment 700 is simplified with less L12 routers deployed in the convergence layer 720. In particular, two routers MTR1 and MTR2 are deployed in FIG. 7 to support L1 routers RT1 to RTn compared to six routers MTR1 to MTR6 in the corresponding convergence layer 120 in FIG. 1. In this example, less L12 routers are required because a filtering strategy may be configured to enable complete or partial LSDB isolation, effectively separating the L1 routers into different logical areas to reduce link state information flooding.

Similar to FIG. 1, LSDB isolation between routers may be achieved by pre-configuring a filtering strategy (e.g. see 740 at MTR1). For example, as described, an interface filtering strategy 740 that includes the system ID of RT1 may be pre-configured on a router interface of MTR1. When link state information generated by RT1 is received, MTR1 does not send the link state information to RT2. As the filtering strategy 740 achieves LSDB isolation, less L1 routers need to be physically isolated or divided into different areas to achieve LSDB isolation. This in turn reduces the number of L12 routers required in the convergence layer 720.

Default Link State Information

Default link state information that includes default route information may be sent to a router from time to time.

Using the example in FIG. 6, when a global filtering strategy is pre-configured on a router interface (e.g. P2) between MTR and RT2, RT2 does not receive link state information of neighbour routers RT1, RT3 to RTn. Therefore, RT2 is unable to calculate routes to these routers.

To remedy this, MTR generates and sends default link state information that includes default route information of other routers to RT2. The default link state information specifies that RT2 can reach other parts of the network via MTR. For example, if RT2 wishes to send packets to a neighbour L1 router (e.g. RT1) but cannot find matching routing information to RT1 in its database, RT2 uses the default route information to reach RT1 via MTR.

In practice, default route '0.0.0.0/0' is used to indicate that any section of the network may be reached. When RT2 wishes to forward packets to a destination address but cannot find any routing information associated with the destination address, RT2 performs route calculation based on '0.0.0.0/0'. The calculated next hop will be MTR, i.e. the sender of the default route information. As such, RT2 will send all packets via MTR to reach another part in the network.

Network Device 800

Figure 8:
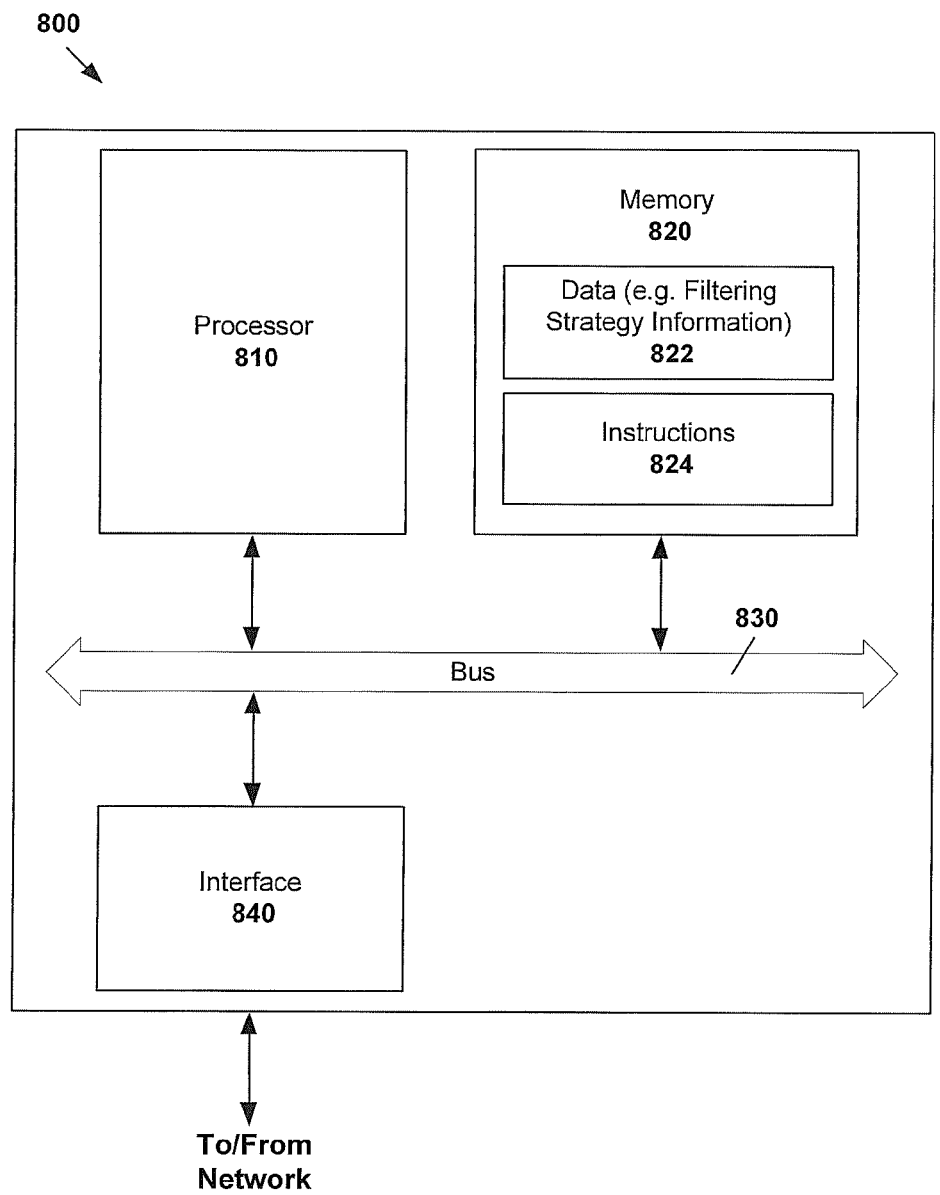
FIG. 8 is a block diagram of an example structure of a routing device for reducing flooding of link state information.

The above examples can be implemented by hardware, software or firmware or a combination thereof. Referring to FIG. 8, an example network device 800 capable of acting as a router (e.g. 112, 122, 132 in FIG. 1) is shown.

The example network device 800 includes a processor 810, a memory 820 and a network interface device 840 that communicate with each other via bus 830. The memory 820 stores any necessary data 822 and machine-readable instructions 824 to perform any of the processes described in the present disclosure. For example, the data 822 may include information relating to filtering strategy to enable LSDB isolation between routers.

The processor 810 is to perform processes described herein. In one example, the processor 810 is to:
  Pre-configure a filtering strategy on a router interface for filtering link state information generated by a first router. The filtering strategy is to enable LSDB isolation between a second router associated with the router interface and the first router.
  Receive or send link state information generated by the first router according to the pre-configured filtering strategy via the router interface.

The memory 820 may store machine-readable instructions 824 to cause the processor 810 to perform processes described herein. In one example, the instructions 824 may include:
  Filtering strategy instructions to cause the processor 810 to pre-configure a filtering strategy on a router interface for filtering link state information generated by a first router. The filtering strategy is to enable link state database (LSDB) isolation between a second router associated with the router interface and the first router.
  Processing instructions to cause the processor 810 to receive or send link state information generated by the first router according to the pre-configured filtering strategy via the router interface.

The network device 800 in FIG. 8 may include units to perform the processes described herein. In one example, the network device 800 may include the following modules:
  Filtering strategy module to pre-configure a filtering strategy on a router interface for filtering link state information generated by a first router. The filtering strategy is to enable link state database (LSDB) isolation between a second router associated with the router interface and the first router.
  The filtering strategy module may include a global filtering strategy unit and an interface routing strategy unit to implement the global filtering strategy and interface routing strategy respectively.
  Processing module to receive or send link state information generated by the first router according to the pre-configured filtering strategy via the router interface.

The methods, processes and functional units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors 810; reference in this disclosure or the claims to a 'processor' should thus be interpreted to mean 'one or more processors'.

Although one network interface device 840 is shown in FIG. 8, processes performed by the network interface device 840 may be split among multiple network interface devices (not shown for simplicity). As such, reference in this disclosure to a 'network interface device' should be interpreted to mean 'one or more network interface devices".

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for reducing flooding of link state information of a link state protocol in a network with multiple routers, comprising:
  pre-configuring a filtering strategy on a router interface for filtering link state information generated by a first router, wherein the filtering strategy is to enable link state database (LSDB) isolation between a second router associated with the router interface and the first router; and
  receiving or sending link state information generated by the first router according to the pre-configured filtering strategy via the router interface, wherein the filtering strategy is a global filtering strategy to enable LSDB isolation between the second router and first router, and the first router is not an upstream neighbour of the second router.

2. The method of claim 1, wherein receiving or sending the link state information generated by the first router according to the global filtering strategy comprises:
  checking whether the first router is an upstream neighbour of the second router;
  if yes, receiving or sending the link state information via the router interface; but otherwise, discarding or not sending the link state information respectively.

3. The method of claim 1, the method further comprises:
  sending, to the second router, default link state information to generate default routes to the first router.

4. The method of claim 1, wherein the filtering strategy is an interface filtering strategy to enable LSDB isolation between the second router and first router based on a system ID of the first router.

5. The method of claim 4, wherein receiving or sending the link state information generated by the first router according to the interface filtering strategy comprises:

checking whether the system ID of the first router satisfies the interface filtering strategy; and if yes, receiving or sending the link state information via the router interface; but otherwise, discarding or not sending the link state information respectively.

6. The method of claim 1, wherein the router interface is a router interface of the second router, or a router interface of an upstream neighbour of the second router.

7. The method of claim 1, wherein the link state protocol is Intermediate System-to-Intermediate System (ISIS) and the link state information is a link state packet (LSP).

8. A network device for reducing flooding of link state information of a link state protocol in a network with multiple routers, wherein the network device is capable of acting as a router and comprises a processor to:

pre-configure a filtering strategy on a router interface for filtering link state information generated by a first router, wherein the filtering strategy is to enable link state database (LSDB) isolation between a second router associated with the router interface and the first router; and receive or send link state information generated by the first router according to the pre-configured filtering strategy via the router interface, wherein the processor is to pre-configure a global filtering strategy to enable LSDB isolation between the second router and first router, and the first router is not an upstream neighbour of the second router.

9. The network device of claim 8, wherein when receiving or sending the link state information generated by the first router according to the global filtering strategy, the processor is to:

check whether the first router is an upstream neighbour of the second router;

if yes, receive or send the link state information via the router interface; but otherwise, discard or not send the link state information respectively.

10. The network device of claim 8, wherein the processor is further to:

send, to the second router, default link state information to generate default routes to the first router.

11. The network device of claim 8, wherein the processor is to pre-configure an interface filtering strategy to enable LSDB isolation between the second router and first router based on a system ID of the first router.

12. The network device of claim 11, wherein when receiving or sending the link state information generated by the first router according to the interface filtering strategy, the processor is to:

check whether the system ID of the first router satisfies the interface filtering strategy; and if yes, receive or send the link state information via the router interface; but otherwise, discard or not send the link state information respectively.

13. The network device of claim 8, wherein the link state protocol is Intermediate System-to-Intermediate System (ISIS) and the link state information is a link state packet (LSP).

* * * * *